G. S. BLAKESLEE.
ROLL WARMER.
APPLICATION FILED AUG. 5, 1907.
988,619.
Patented Apr. 4, 1911.
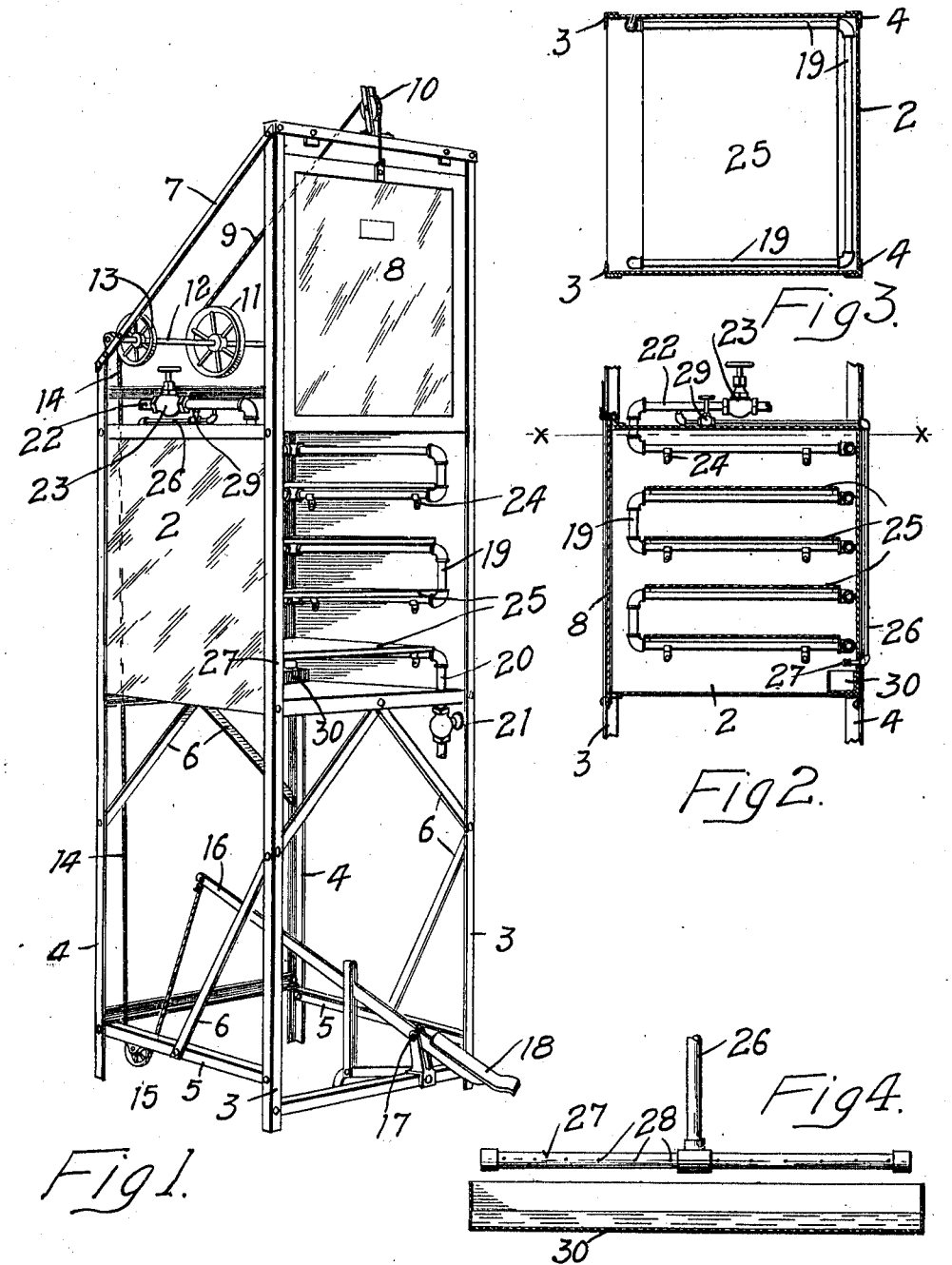
WITNESSES
INVENTOR
GEORGE S. BLAKESLEE
BY Paul & Paul
HIS ATTORNEYS

UNITED STATES PATENT OFFICE.

GEORGE S. BLAKESLEE, OF CHICAGO, ILLINOIS.

ROLL-WARMER.

988,619.  Specification of Letters Patent.  Patented Apr. 4, 1911.

Application filed August 5, 1907. Serial No. 387,043.

*To all whom it may concern:*

Be it known that I, GEORGE S. BLAKESLEE, of Chicago, Cook county, Illinois, have invented certain new and useful Improvements in Roll-Warmers, of which the following is a specification.

My invention relates to machines for warming or steaming rolls for the purpose of keeping them fresh and moist and in suitable condition to be served.

A further object is to provide an apparatus of simple, economical construction, one that will have a large capacity and be very rapid and efficient in its work.

The invention consists generally in various constructions and combinations, all as hereinafter described and particularly pointed out in the claim.

In the accompanying drawings, forming part of this specification, Figure 1 is a perspective view of a roll-warming apparatus embodying my invention. Fig. 2 is a vertical sectional view of the warming oven. Fig. 3 is a horizontal sectional view on the line x—x of Fig. 2. Fig. 4 is a detail view of the steaming device and the drip pan therefor.

In the drawing, 2 represents the oven of the warming apparatus supported upon front legs 3 and rear legs 4 connected by suitable bars and braces 5 and 6. The legs 3 extend above the upper ends of the legs 4 and are connected therewith by straps 7, and a gate 8 is slidably arranged between the legs 3 and is adapted to close the front of the oven or be raised to a point near the upper ends of the legs 3 to allow access to the oven. This gate is operated by means of a cable 9 connected to the upper end of the gate and passing over a pulley 10 and attached to a wheel 11 on a shaft 12. A wheel 13 on the shaft 12 has a cord 14 connected thereto which passes down under a wheel 15 and is connected to the inner end of a lever 16 that is pivoted at 17 and has a treadle 18 within convenient reach of the attendant by means of which the lever may be oscillated to rotate the shaft 12 and raise the gate.

Within the oven I arrange a series of loops 19 which are carried horizontally back and forth on the walls of the oven on the three sides thereof and terminate in a discharge pipe 20 having a valve 21. A supply pipe 22 is connected to the receiving end of the loops and is provided with a valve 23 by means of which the entrance of steam to the loops is controlled. The loops are supported in any suitable way on the walls of the oven, preferably by means of the clips 24.

Upon each horizontal section of the loops a shelf 25 is placed upon which the rolls or other articles of food to be warmed or steamed may be laid. The shelf 25 may be made of sheet metal perforated or of wire mesh, as preferred, and instead of resting the shelves upon the steam coils, clips or lugs may be fastened through the walls of the oven. This, however, is regarded as an obvious modification and unnecessary of illustration.

For the purpose of admitting steam to the oven or chamber to moisten the bread, I provide a pipe 26 connected to the pipe 22 and extending down to a point near the bottom of the oven and terminating in a horizontal tube 27 having a series of perforations 28 through which the steam is allowed to escape into the lower portion of the oven. A valve 29 is provided in the pipe 26 and a drip pan 30 is located below the pipe 27 in position to receive the water of condensation therefrom. This drip pan is readily removable whenever it is desired to empty the water or clean the interior of the oven or steaming chamber.

With this apparatus I am able to conduct the steam under pressure directly through the steaming chamber avoiding the use of regulating valves and all danger incident to the admission of steam to a hollow space or chamber provided between inner and outer walls. The loops or coils extending around the walls of the steaming chamber are capable of sustaining any pressure to which they may be subjected and their use enables me to dispense entirely with the inner perforated wall of the chamber heretofore employed in an apparatus of this kind. By means of the auxiliary valve and the perforated pipe I am able to steam or moisten the bread to any degree desired.

I claim as my invention:

An apparatus for steaming or moistening bread comprising a chamber or oven having single imperforate side and rear walls, a steam supply pipe having a controlling valve, a series of steam coils arranged on three sides of said oven close to the walls thereof, the horizontal portions of said coils being suitably spaced apart from the top to the bottom of the oven, shelves resting upon said horizontal portions, an auxiliary pipe connected with said steam supply pipe between its valve and the upper steam coil, a perforated pipe arranged near the bottom of said oven and connected with said auxiliary pipe, and a removable pan arranged below said perforated pipe, substantially as described and for the purpose specified.

In witness whereof, I have hereunto set my hand this 1st day of August 1907.

GEORGE S. BLAKESLEE.

Witnesses:
H. C. Ross,
E. K. McQuillan.

Copies of this patent may be obtained for five cents each, by addressing the "Commissioner of Patents, Washington, D. C."